(12) United States Patent
Longoni et al.

(10) Patent No.: US 8,233,442 B1
(45) Date of Patent: Jul. 31, 2012

(54) DISCONTINUOUS TRANSMISSION CDMA SYSTEM

(75) Inventors: Fabio Longoni, Espoo (FI); Kalle Ahmavaara, Helsinki (FI)

(73) Assignee: Core Wireless Licensing S.A.R.L., Plano, TX (US)

( * ) Notice: Subject to any disclaimer, the term of this patent is extended or adjusted under 35 U.S.C. 154(b) by 0 days.

(21) Appl. No.: 09/959,034

(22) PCT Filed: Apr. 17, 2000

(86) PCT No.: PCT/EP00/03453
§ 371 (c)(1),
(2), (4) Date: Jan. 8, 2002

(87) PCT Pub. No.: WO00/64075
PCT Pub. Date: Oct. 26, 2000

(30) Foreign Application Priority Data

Apr. 16, 1999  (GB) .................................. 9908805.6
Apr. 27, 1999  (GB) .................................. 9909689.3

(51) Int. Cl.
*H04W 4/00* (2009.01)
(52) U.S. Cl. ..................... 370/329; 370/330; 370/331
(58) Field of Classification Search ............... 370/331, 370/335, 338, 400, 401
See application file for complete search history.

(56) References Cited

U.S. PATENT DOCUMENTS

| | | | | | |
|---|---|---|---|---|---|
| 4,654,867 | A | * | 3/1987 | Labedz et al. | 455/438 |
| 4,774,706 | A | * | 9/1988 | Adams | 370/465 |
| 5,111,456 | A | * | 5/1992 | Limb | 370/440 |
| 5,708,656 | A | * | 1/1998 | Noneman et al. | 370/335 |
| 5,793,744 | A | * | 8/1998 | Kanerva et al. | 370/209 |
| 6,052,385 | A | * | 4/2000 | Kanerva et al. | 370/468 |
| 6,308,066 | B1 | * | 10/2001 | Ranta et al. | 455/436 |
| 6,366,572 | B1 | * | 4/2002 | Esterberg et al. | 370/343 |
| 6,408,003 | B1 | * | 6/2002 | Rezaiifar et al. | 370/394 |

FOREIGN PATENT DOCUMENTS

| | | |
|---|---|---|
| EP | 0565504 | 10/1993 |
| WO | 9702651 | 1/1997 |

* cited by examiner

*Primary Examiner* — Chi Pham
*Assistant Examiner* — Farah Faroul
(74) *Attorney, Agent, or Firm* — Ware, Fressola, Van Der Sluys & Adolphson LLP

(57) ABSTRACT

A method of transmitting from a first node to a second node, said method comprising the steps of transmitting in a first mode at least one data frame from said first node to said second node; and determining if there is no data to be transmitted and if there is no data to be transmitted transmitting at least one empty frame in the first mode; and switching to a second mode in which no transmission is made in the absence of data to be transmitted at least some of the time.

36 Claims, 3 Drawing Sheets

DISCONTINUOUS TRANSMISSION CDMA SYSTEM

FIELD OF THE INVENTION

The present invention relates to a method of transmitting and in particular but not exclusively to a method of transmitting in a wireless telecommunications network.

BACKGROUND OF THE INVENTION

The use of code division multiple access (CDMA) is being proposed for the next generation of cellular telecommunication networks. Additionally, code division multiple access is also being used in the IS-95 Standard in the USA. CDMA is a direct sequence spread spectrum technique. In a wireless cellular network using CDMA, the mobile terminals in one cell associated with a first base station will use the same frequency as mobile stations in an adjacent cell associated with a second base station. The different mobile stations can be distinguished by the respective base stations as each mobile station will be using a different spreading code.

In U.S. Pat. No. 5,101,501 a CDMA system is described which uses "soft" handoff. With soft handoff, a mobile station is capable of communicating with more than one base station at the same time. This will typically occur when the mobile station is close to the boundary defined between two cells. The signals sent by the mobile stations will be received and processed by both of the base stations. Likewise, the mobile station will receive the same signal from the two base stations. The signals from the two base stations may be combined. The combined signal may provide better quality than any of the individual signals received by the mobile station.

Thus, one mobile station can listen to two or more base stations simultaneously. It is therefore important that the information received by the mobile stations from the different base station be identical. If different information is received from the different base stations, the mobile station will have no way of determining which is the correct information and which information can be ignored. Additionally it will not be possible to combine the signals from the different base stations to provide a meaningful combined signal.

Generally, different information will be received by the mobile station because an error in transmission has occurred and one of the expected transmissions from one or more of the base stations is not transmitted by the base station. The base station may not receive any information to be transmitted to the mobile station for two reasons. Firstly there has been an error in the information received by the base station. Secondly, there is in fact no information to be received. The lack of information may be due to, for example a pause in conversation or because the transmission is a discontinuous transmission. It is therefore necessary to determine whether the lack of received information is intentional or whether it is due to an error.

It has been suggested by the inventor that empty frames of data can be sent to the base station in two different ways. These two ways do not constitute prior art. Firstly, the transmission is suspended. In other words, the base station will be sent nothing. This has the advantage that the processing resources at the base station are saved as well as in other network elements. The load at the interface between the base station and the network controller, which is sending the information to the base station, is reduced. However this method has the disadvantage that it is not possible to distinguish between a transmission error and the fact that there is no data. This leads to two problems.

Firstly, failures in the interface between the base station and the network controller are not detected by the base station in the case of information being sent from the network controller to the base station or by the network controller in the case of information being sent from the base station to the network controller.

Secondly, if a data frame is not received, due to an error, by a base station, that data frame cannot be transmitted by the base station to the mobile station. If the mobile station is in soft handoff, that is communicating with more than one base station at a time, the mobile station will receive different data streams from the base stations due to the error. This may lead to errors in the mobile station when it attempts to combine the different data streams.

The second method for dealing with empty frames of data is for the base station to be sent empty frames of data. This makes it possible to distinguish between errors and the fact that there is no information. However, this method does have the disadvantage that additional processing capacity is required at the base station and other network elements. Additionally, the load at the interface between the base station and the network controller is increased.

Similar problems can also occur in the uplink directions.

SUMMARY OF THE INVENTION

It is an aim of embodiments of the present invention to provide a method of dealing with the absence of information or data which addresses the disadvantages of the known methods.

According to one aspect of the present invention, there is provided a method of transmitting from a first node to a second node, the method comprising the steps of transmitting in a first mode at least one data frame from the first node to the second node; and determining if there is no data to be transmitted and if there is no data to be transmitted transmitting at least one empty frame in the first mode; and switching to a second mode in which no transmission is made in the absence of data to be transmitted at least some of the time.

The first and second nodes may be any suitable elements in a telecommunications network.

According to a second aspect of the present invention there is provided a method of receiving transmissions from a first node at a second node, the transmission has a first mode in which if there is no data to be transmitted, empty frames are transmitted and a second mode in which if there is no data to be transmitted nothing is transmitted, the method comprising the steps of: receiving transmissions from the first node, wherein if the transmissions have a first mode and a frame is not received an error is determined to have occurred.

According to a third aspect of the present invention there is provided a first node for transmitting data to a second node, wherein the first node comprises transmitting means for transmitting data to the second node, the transmitting means have a first mode of operation in which data is transmitted in data frames and if there is no data to be transmitted empty frames are transmitted and a second mode of operation in which if there is no data, no frames are transmitted.

According to a fourth aspect of the present invention, there is provided a second node for receiving transmissions from a first node at a second node, the transmissions have a first mode in which if there is no data to be transmitted, empty frames are transmitted and a second mode in which if there is no data to be transmitted nothing is transmitted, the second node comprising means for receiving transmissions from the first node, and determining means for determining that if the transmissions have a first mode and a frame is not received, an error has occurred.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
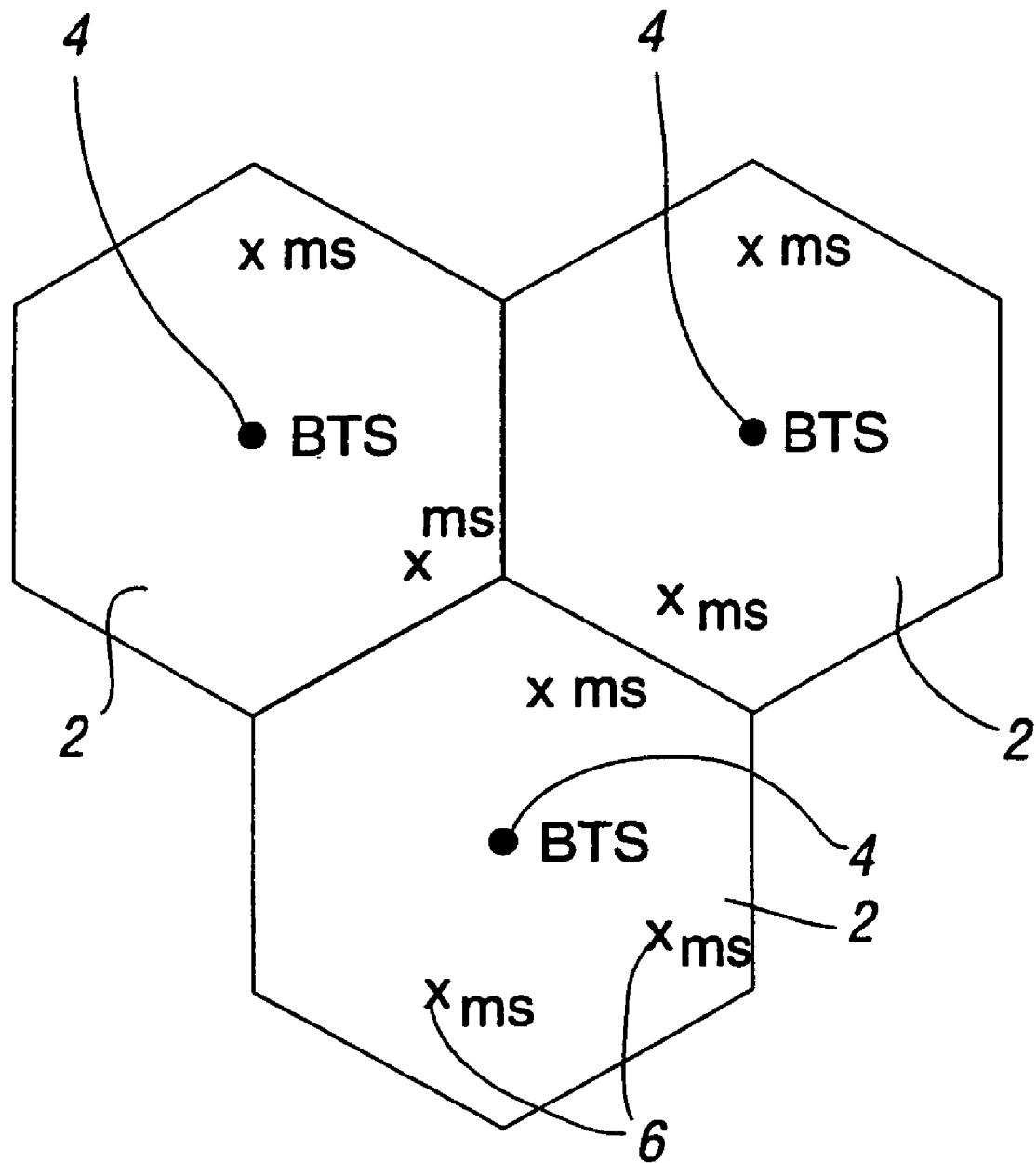
FIG. 1 shows a schematic diagram of part of a cellular telecommunications network incorporating base transceiver stations and mobile stations.

Reference will first be made to FIG. 1 in which three cells 2 of a cellular telecommunications network are shown. Each cell 2 is served by a respective base transceiver station (BTS) 4. Each base transceiver station 4 is arranged to transmit signals to and receive signals from the mobile stations 6 located in the cell associated with the given base transceiver station 4. Likewise, each mobile station 6 is able to transmit signals to and receive signals from the respective base transceiver station 4.

The cellular telecommunications network shown in FIG. 1 uses a code division multiple access technique. Accordingly, at least some of the mobile stations will be in communication with more than one base station at the same time. This, however, will be described in more detail hereinafter.

Figure 2:
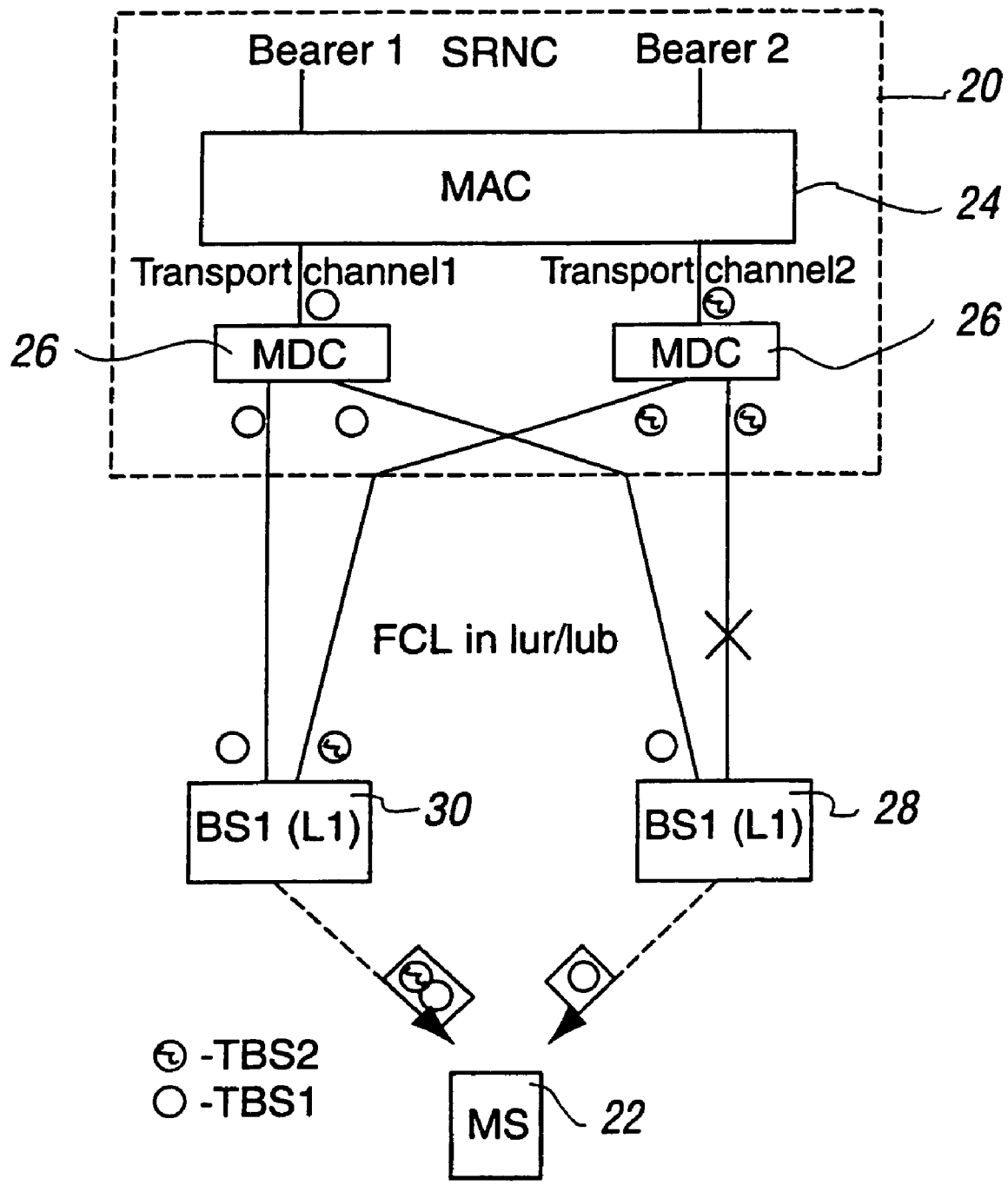
FIG. 2 shows part of the network of FIG. 1 in more detail.

Reference is now made to FIG. 2. As can be seen from this figure, the base stations are connected to a SRNC (serving radio network controller) 20. Data blocks are transmitted between the SRNC 20 and the base stations 28 and 30 using a frame protocol FP. A data frame contains data which is to be transmitted in one interleaving period and a transport format indicator TFI. The interleaving period is the period over which data is interleaved. The transport format indicator TFI provides information as to the format of the data frame such as the size of the data block, the interleaving period and the like.

Each UE (user equipment for example mobile stations or the like) has an independent transport connection which means that each frame contains the data and current transport format indicator TFI of one bearer only. Typically a call will have more than one bearer, for example a signalling bearer and a data or voice bearer. For downlink communications (from the SRNC 20 to the base station direction), all the data blocks of users having the same user equipment are multiplexed onto a single radio link. The manner in which the multiplexing is done will depend on the transport format indicator TFI of each frame which indicates the amount of data in each frame for the bearers. A transport format combination information TFCI field of the radio frame provided in a dedicated physical control channel DPCCH will indicate the manner in which the multiplexing is carried out. The transport format combination information TFCI field will indicate the transport format indicator TFI for each of the bearers whose data is multiplexed in the radio frame or frames in the dedicated physical data channel DPDCH. In the case of soft handoff where a mobile station is in communication with more than one mobile station at a time, the dedicated physical data channels DPDCH from each of the base stations communicating with the mobile station in question will be the same as will the rate information RI fields in all the radio links.

The format described hereinbefore is part of the currently proposed UMTS (universal mobile telephone service) standard. It should be appreciated that any other standard can alternatively be used.

In the following, it is assumed for simplicity that there is only one bearer per transport channel and the SRNC does not carry out any multiplexing. The transport format information can have a particular value which indicates that the frame does not contain any data. For simplicity it is assumed that the particular value is zero although the particular value can be any other value.

The SRNC 20 shown in FIG. 2 has first and second medium access controllers MAC 24 which receive the data from respective bearers. For simplicity, the medium access controllers 24 are each shown as receiving information from one bearer only. The medium access controllers can receive information from more than one bearer and carry out the multiplexing function described hereinbefore.

The medium access controller 24 receives an input from a first bearer Bearer 1 and a second bearer, Bearer 2 and outputs a first transport channel 1 and a second transport channel 2. The input from Bearer 1 maps to the first transport channel 1 and the input from Bearer 2 maps to the second transport channel 2. The transport channels are input to respective macrodiversity combiners 26. The macrodiversity combiners 26 output the transport channels to each base station which is in communication with the mobile station for which the transport channel is intended. In the example shown in FIG. 2, the first transport channel 1 is output to first and second base stations 28 and 30 as is the second transport channel 2. Thus the first and second base stations are each arranged to transmit the same channels to a single mobile station.

Figure 3:
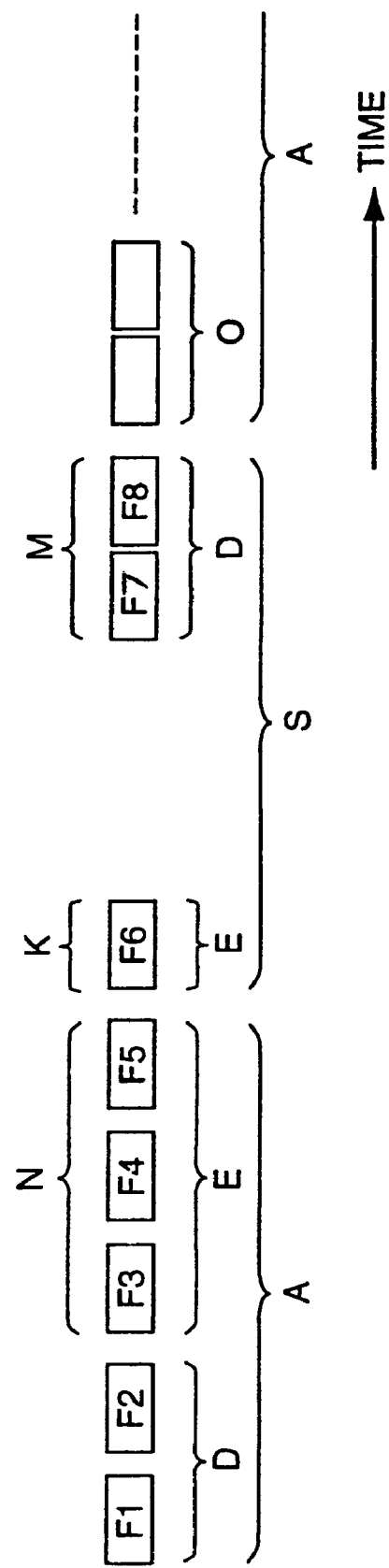
FIG. 3 illustrates the normal and silent modes used by the base stations of FIG. 1.

The mode of operation for transmission of information between the SRNC 20 and base stations will now be described with reference to FIG. 3. Two modes are defined. The first mode is the normal mode and the second mode is the silent mode. The data which is to be sent to the mobile station is interspersed with periods where there is no data. This may occur during pauses in a conversation between two parties. Alternatively, in the case of non speech data, the data may be discontinuous.

In the normal mode A of operation, on the transmit side, the SRNC 20 transmits a frame F for every interleaving period. As shown in FIG. 3, frames F1 and F2 contain data. If no data is present, frames F3, F4 and F5 which are empty frames E are sent. After N consecutively received empty frames E, the frame protocol connection is switched to the silent mode S. N can have any suitable value such as 1, 2 or 3 or any other suitable value.

In the silent mode S, on the transmit side, the SRNC 20 is prevented from transmitting any frame if there is no data in the frame. The SRNC may transmit K empty frames F6 at the beginning of the silent mode S to ensure that the base station has switched to the silent mode; also if up to K of the N empty frames previously sent have been lost during the transmission. After M consecutive frames F7 and F8 including data are transmitted, the frame protocol connection is switched to the normal mode A again. K may be 0 or 1 or any other suitable number. M can be 1, 2, 3 or any other suitable number.

In the normal mode A, on the receive side, if a frame is not received in an interleaving period, the base station generates an interface failure alarm and decides whether to transmit the radio frame without the data or to not transmit the frame at all.

After the base station has received N empty frames, the frame protocol connection is switched to the silent mode S.

In the silent mode S, on the receive side, if a frame is not received in one interleaving period, the base station considers the bearer to be in an inactive state and sets the transport format indicator TFI to zero. After M consecutive data frames with data have been received, the frame control layer connection is switched to the normal mode A.

The parameters M, N and K may be:

1. predetermined, for example fixed in a standard used by the network;
2. Iub/Iur (Iub is the interface between the SRNC and the base station while Iur is the interface between two radio network controllers) interface protocol configurable parameters, that is the parameters can be set at each interface as required; and
3. signalled from the SRNC to base stations every time a new branch or bearer is set. The parameters may be reconfigurable as required.

Control frames which do not contain data but instead contain control information such as power control and synchronisation information are sent in both the normal mode and the silent mode. Control frames may not be present in either or both of these modes.

Reference will now be made to a second embodiment of the present invention which uses explicit signalling in order to switch from the normal mode to the silent mode. In this second embodiment, the base station will not automatically switch to the silent mode when a predetermined number of consecutive empty frames have been received. However, the transmission of a predetermined number of empty frames when in the normal mode can be used as an indication that the silent mode should be used. Of course, any other suitable measure can be used to determine that a switch should be made between the normal and the silent mode.

Once a determination has been made that the base station should stop using the normal mode and start using the silent mode, the radio network controller will include in the next frame sent to the base station a mode bit indicative of this determination. This mode bit may have a given value for the silent mode and the other value for the normal mode. Alternatively, one value of the bit indicates that the mode should change either from the normal to the silent mode or from the silent mode to the normal mode. The other value of the bit would indicate that the mode is not to be changed.

When the base station receives the frame transmitted by the radio network controller, it checks the mode bit. If this bit indicates that the mode is to change from the normal mode to the silent mode, the base station changes its mode and sends an acknowledgement confirming that the base station has understood that the mode is changed. Once the radio network controller has received the acknowledgement from the base station, the radio network controller will use the silent mode.

Changes from the silent mode to the normal mode can be achieved in the same way as in the first embodiment. However, it is also possible to alter the mode from the silent to normal mode in the following. When it is determined that the base station is to receive using the normal mode, the radio network controller will alter the mode bit in the next frame sent to the base station, to indicate that the mode should change to the normal mode. If a data frame is being sent to the base station, the mode bit will be altered in that frame. If no data frame is being sent to the base station due to an absence of data, the radio network controller will send an empty frame with the mode bit set accordingly.

The base station will send an acknowledgement indicating that it has received the frame and has noted that the mode is changed to the normal mode. When the radio network controller receives the acknowledgement, the radio network controller will then use the normal mode.

It is possible to use this second method to notify the base station by sending in advance information that the mode will change after a predetermined number of frames or the like.

The method used by the first embodiment has the advantage that the frame structure does not need to be altered. A second advantage of the first method is that two way communication does not have to be set up if one party, for example, the radio network controller is sending data to the base station and the base station is not sending any data to the radio network controller. The second method is advantageous in that both parties are certain as to which mode of operation is being used.

The acknowledgement sent by the base station to the radio network controller may use a mode bit in the frame, as described hereinbefore in relation to the frames sent from the radio network controller to the base station. Thus the acknowledgement may comprise the mode bit in the frame sent by the base station to the radio network changing to reflect the new mode. Either of the options for the mode bit described hereinbefore may be used.

It should be appreciated that although the transmissions from the SRNC to the base station are described as using the normal and silent mode of operation, this mode of operation can alternatively or additionally be used for transmissions from the base station to the SRNC. The values of the parameters used in the downlink and uplink directions may differ. Embodiments of the present invention may be applied to the communications between any two nodes of a telecommunications network, wired or wireless.

It should be appreciated that although embodiments of the present invention are particularly advantageous when used in a soft handoff or similar context, that is when a mobile station is in communication with more than one base station at the same time, embodiments of the present invention can also advantageously be used where the mobile station is in communication with one base station at a time. In an alternative embodiment of the present invention, the normal and silent mode of operation may only be used when the mobile station is in communication with more than one base station at a time. A different mode of operation may be used when the mobile station is in communication with only one base station. The different mode of operation may be one which incorporates one of the previously known methods for dealing with empty frames.

Whilst preferred embodiments have been described in the context of a code division multiple access system, embodiments of the present invention can be used with any other spread spectrum technique or any other suitable access technique such as time division multiple access, frequency division multiple and space division multiple access as well as hybrids thereof.

The invention claimed is:

1. A method comprising:
    transmitting in a first mode at least one data frame from a first node to a second node; and
    determining if there is no data to be transmitted from said first node to said second node and if there is no data to be transmitted, transmitting from said first, node to said second node at least one empty frame in the first mode;
    switching to a second mode, wherein in said second mode no transmission of any frame is made from said first node to said second node in the absence of data to be transmitted from said first node to said second node; and
    switching to said second mode if a predetermined number of empty frames are transmitted consecutively.

2. A method as claimed in claim 1, comprising transmitting data in data frames from said first node to said second node whilst in said second mode when there is data to be transmitted from said first node.

3. A method as claimed in claim 2, comprising switching automatically to the second mode if the predetermined number of empty frames are transmitted consecutively.

4. A method as claimed in claim 1, comprising sending information to the second node advising that the mode is to change from the first mode to the second mode.

5. A method as claimed in claim 4, comprising receiving at the first node confirmation of receipt of said information and then using said second mode.

6. A method as claimed in claim 4, comprising including said information in a frame transmitted from the first node to the second node.

7. A method as claimed in claim 4, comprising sending said information in advance of the change of mode.

8. A method as claimed in claim 1, comprising switching from said second mode to said first mode if a predetermined number of data frames are transmitted.

9. A method as claimed in claim 8, comprising switching automatically to the first mode if the predetermined number of data frames is received in said second mode.

10. A method as claimed in claim 9, comprising, when the first node is using the second mode and the mode is to be switched to the first mode, transmitting from the first node information that the mode is to be switched to said second mode.

11. A method as claimed in claim 10, comprising switching to the first mode when receiving at the first node from the second node confirmation receipt of said information that the mode is to be switched from said second mode to the first mode.

12. A method as claimed in claim 8, wherein said predetermined number of frames are consecutive frames.

13. A method as claimed in claim 1, comprising transmitting from the first node the same data to a plurality of second nodes, for transmission by said plurality of second nodes to a third node.

14. A method as claimed in claim 1, wherein said first node is a base station or a radio network controller in a wireless cellular telecommunications network.

15. A method as claimed in claim 1, wherein said second node is a base station or a radio network controller in a wireless cellular telecommunications network.

16. A method comprising,
transmitting in a first mode at least one data frame from a first node to a second node; and
determining if there is no data to be transmitted and if there is no data to be transmitted, transmitting at least one empty frame in the first mode; and
switching to a second mode, wherein in said second mode no transmission is made in the absence of data to be transmitted,
wherein if no data is to be transmitted at the beginning of the second mode, first transmitting a predetermined number of empty frames and then making no transmission of any frame in the absence of data to be transmitted.

17. A method as claimed in claim 16, further comprising transmitting data in data frames from said first node to said second node whilst in said second mode when there is data to be transmitted from said first node.

18. An apparatus comprising: transmitting means for transmitting data from a first node to a second node, said transmitting means have a first mode of operation in which data is transmitted in data frames and if there is no data to be transmitted, empty frames are transmitted, and a second mode of operation in which if there is no data to be transmitted, no frames are transmitted, wherein said transmitting means is configured to switch to said second mode if a predetermined number of empty frames are transmitted consecutively.

19. The apparatus as claimed in claim 18, wherein said transmitting means is configured to transmit data in data frames from said first node to said second node when there is data to be transmitted from said first node to said second node.

20. A method comprising:
transmitting in a first mode at least one data frame from a first node to a second node; and
determining if there is no data to be transmitted from said first node to said second node and if there is no data to be transmitted, transmitting from said first node to said second node at least one empty frame in the first mode, wherein said at least one empty frame includes transport format information indicating that the frame does not contain any data;
switching to a second mode, wherein in said second mode no transmission of any frame is made from said first node to said second node in the absence of data to be transmitted from said first node to said second node; and
switching to said second mode if a predetermined number of empty frames are transmitted consecutively.

21. A method as claimed in claim 20, comprising transmitting data in data frames from said first node to said second node whilst in said second mode when there is data to be transmitted from said first node.

22. A method as claimed in claim 20, comprising sending from the first node to the second node information advising of a change from the first mode to the second mode.

23. A method as claimed in claim 20, comprising switching from said second mode to said first mode if a predetermined number of data frames are transmitted.

24. A method as claimed in claim 20, comprising when switching from the second mode to the first mode, transmitting from the first node to the second node information advising of a switch to said first mode.

25. A method as claimed in claim 20, comprising if no data is to be transmitted at the beginning of the second mode, first transmitting a predetermined number of empty frames and then making no transmission of any frame in the absence of data to be transmitted.

26. A method as claimed in claim 20, comprising: transmitting the same data to a plurality of second nodes, for transmission from said plurality of second nodes to a third node.

27. An apparatus comprising: a transmitter configured to transmit data from a first node to a second node, said transmitter having a first mode of operation in which the transmitter transmits data in data frames and if there is no data to be transmitted, transmits empty frames, and a second mode of operation in which the transmitter transmits no frames if there is no data to be transmitted, wherein said apparatus is further configured to switch to said second mode if a predetermined number of empty frames are transmitted consecutively.

28. A method comprising:
operating in a first mode in which a data frame is transmitted from a first node to a second node for each time period for which there is data to be transmitted from said first node to said second node, and an empty frame is transmitted from said first node to said second node for each time period for which there is no data to be transmitted; and switching to a second mode in which no frame is transmitted from said first node to said second node for each time period for which there is no data to be transmitted, and switching to said second mode if a predetermined number of empty frames are transmitted consecutively.

29. An apparatus comprising: a transmitter configured to transmit data from a first node to a second node in data frames, said transmitter having a first mode of operation in which the transmitter transmits an empty frame from said first node to said second node for each time period for which there is no data to be transmitted; and a second mode of operation in which the transmitter transmits no frame from said first node to said second node for each time period for which there is no data to be transmitted, wherein said apparatus is further configured to switch to said second mode if a predetermined number of empty frames are transmitted consecutively.

30. An apparatus comprising:
a transmitter configured to send from a first node to a second node, information indicative of whether said first node should operate in a first mode or a second mode; wherein said first mode includes transmitting a data frame from the first node when there is data to be transmitted from the first node and transmitting an empty frame from the first node if there is no data to be transmitted from the first node; and said second mode includes transmitting no frame in the absence of data to be transmitted from the first node.

31. An apparatus comprising:
receiving means receiving at a first node from a second node information indicative of whether said first node should operate in a first mode or a second mode; wherein said first mode includes transmitting a data frame from the first node when there is data to be transmitted from the first node and transmitting an empty frame from the first node if there is no data to be transmitted from the first node; and said second mode includes transmitting no frame in the absence of data to be transmitted from the first node.

32. The apparatus as claimed in claim 31, wherein said second mode is used if a predetermined number of empty frames are transmitted consecutively.

33. An apparatus comprising:
a receiver configured to receive at a first node from a second node information indicative of whether said first node should operate in a first mode or a second mode; wherein said first mode includes transmitting a data frame from the first node when there is data to be transmitted from the first node and transmitting an empty frame from the first node if there is no data to be transmitted from the first node; and said second mode includes transmitting no frame in the absence of data to be transmitted from the first node.

34. The apparatus as claimed in claim 33, wherein said second mode is used if a predetermined number of empty frames are transmitted consecutively.

35. A method comprising:
sending from a second node to a first node information indicative of whether said first node should operate in a first mode or a second mode; wherein said first mode includes transmitting a data frame from the first node when there is data to be transmitted from the first node and transmitting an empty frame from the first node if there is no data to be transmitted from the first node; and said second mode includes transmitting no frame in the absence of data to be transmitted from the first node.

36. A method comprising:
receiving at a first node from a second node information indicative of whether said first node should operate in a first mode or a second mode; wherein said first mode includes transmitting a data frame from the first node when there is data to be transmitted from the first node and transmitting an empty frame from the first node if there is no data to be transmitted from the first node; and said second mode includes transmitting no frame in the absence of data to be transmitted from the first node.

* * * * *

UNITED STATES PATENT AND TRADEMARK OFFICE
CERTIFICATE OF CORRECTION

| | | |
|---|---|---|
| PATENT NO. | : 8,233,442 B1 | Page 1 of 1 |
| APPLICATION NO. | : 09/959034 | |
| DATED | : July 31, 2012 | |
| INVENTOR(S) | : Fabio Longoni et al. | |

It is certified that error appears in the above-identified patent and that said Letters Patent is hereby corrected as shown below:

1. On the cover page of the patent, Item 56 in the "References Cited" section under "Foreign Patent Documents," the application number of the second reference should be --WO 9702561--.

Signed and Sealed this
Twenty-third Day of October, 2012

David J. Kappos
*Director of the United States Patent and Trademark Office*